Sept. 8, 1936.  C. B. WHITE  2,053,858

METHOD OF MAKING ARTIFICIAL STONE AND ITS REMOVAL FROM THE MOLD

Filed March 5, 1931

INVENTOR
Charles B. White

By *[signature]*

ATTORNEYS

Patented Sept. 8, 1936

2,053,858

UNITED STATES PATENT OFFICE 2,053,858

METHOD OF MAKING ARTIFICIAL STONE AND ITS REMOVAL FROM THE MOLD

Charles B. White, Albany, N. Y.

Application March 5, 1931, Serial No. 520,266
In France December, 1930

3 Claims. (Cl. 25—154)

My invention more particularly relates to a mold for making artificial stone or the like, and the method of separating the mold from said stone; whereby a petrified film or veneer can be produced, thin as a sheet of cardboard.

Artificial stone formed of oxychloride cement, containing, for example, magnesium and zinc, is ordinarily formed by pouring the same upon a plate or sheet of material having a very smooth surface, such as glass or polished metal, and after becoming petrified, the cement will take a smooth lustrous surface, similar to the surface upon which it rested during the formative period. In practice, however, it is difficult to release the stone when it is set, from a mold of this character. There appears to be molecular cohesion between the molecules of the mold and those of the cast slab of artificial cement; indeed the intensity of lustre is an index of the intimacy of union between the cement and the mold. The term oxychloride cement in the art is a generic term including oxysulphate cement as well as the oxychloride and it is to be understood that the term oxychloride cement includes both forms.

A mold of the foregoing character is rigid and the entire sheet of stoneware must be simultaneously removed. It is necessary, therefore, that the cast slab of stone be made comparatively thick in order to withstand the internal stresses that are set up therein during the process of removal. It has also been proposed to utilize devices to bring about a molecular dislocation in the stone whereby its molecules work themselves loose from the molecules in the surface of the mold. Such devices, however, are both costly and uncertain in operation. With devices of the foregoing character which have hitherto been utilized for molding or casting artificial stone or cement, breakage takes place either in the stone slab, in the mold, or in both.

In accordance with my invention, a mold formed of a flexible material such as mica, for example, characterized by having a smooth, lustrous, unadhesive surface is provided. The oxychloride cement is then poured or spread upon the mold.

Figure 1:
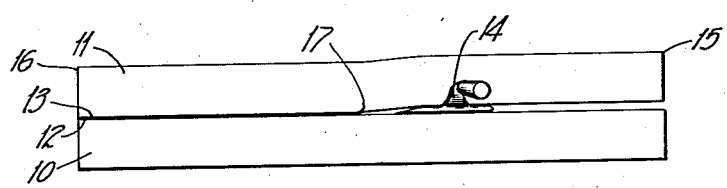
Figure 2:
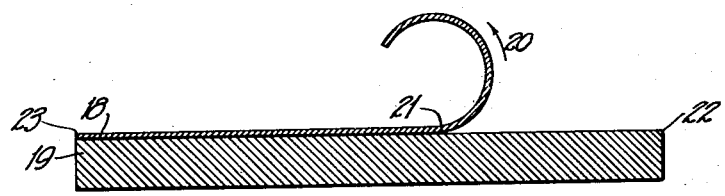
Figure 3:
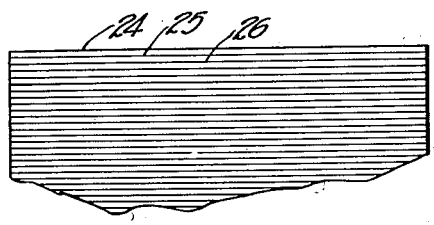

My invention will best be understood by reference to the accompanying drawing in which I have illustrated a preferred embodiment thereof and in which Fig. 1 is a sectional view through a mold of known construction and a slab of artificial stone or cement cast thereon;

Fig. 2 is a similar sectional view illustrating a mold embodying my invention, in the process of being removed from the cast slab; and Fig. 3 is a sectional plan view, illustrating the mold in more detail and the manner in which the mold is progressively removed from the set slab.

Like reference characters indicate like parts throughout the drawing.

In Fig. 1, 10 represents a mold of the usual type, and which, as stated, is usually formed of glass or polished metal. A slab of stone or cement is indicated at 11, the same having been poured upon the mold 10 and permitted to set. The exceedingly smooth and lustrous surfaces 12 and 13 of the mold and the slab or plate of stone adhere to such an extent that they are separated only with difficulty.

Now assuming that a trowel 14, or other separating device, is inserted between the mold 10 and the slab 11 of artificial stone, it will be evident that, when both the mold and the slab are practically rigid, as is usually the case, then when one point, as 15 of the slab is lifted from the mold, all points including the point 16 at the opposite edge of the slab must simultaneously be freed from the mold 10. In other words, the slab of artificial stone must be lifted as a unit. Assuming that a point of stubborn adhesion has been encountered, as indicated at 17, the slab will tend to break at this point since it is necessary, in order to pry the slab loose from the mold to exert sufficient force, to pry the entire slab loose from the point 17 to the edge indicated at 16, which is liable to cause the slab to break at 17 and thereby create a loss both in time and in what is practically finished material.

Fig. 2 illustrates a mold embodying my invention and the procedure made possible thereby. 18 represents a mold, preferably in the form of a film, such as mica or the like, flexible in all directions and with a surface either glazed, or mat, as may be desired. A sheet or slab of cement 19, such as an oxychloride cement, has been poured upon the mold 18 and has set or hardened in situ after having been inverted, and the mold is being separated from the slab of cement. The object of using an oxychloride cement is to provide a film sufficiently hard to have a lustrous surface comparable to that of mica and of a flexibility comparable to that of thin cardboard. Because of the flexibility of the mold 18, it is being lifted from the sheet of artificial stone by a rolling movement, the direction of rotation of the mold being indicated by the arrow 20. Because of such rotary movement, the work of withdrawal exerts, at a given time, a strain along a line transversely of the slab of artificial stone and of the mold, indicated by the point 21. Of course the total strain exerted on the mold 18 in removing the same from the slab of artificial stone amounts in the aggregate to the total strain exerted on the slab 11 in the arrangement that has hitherto been used and as illustrated in Fig. 1. In Fig. 1, however, the strains are integrated into one single strain for the entire slab, whereas, in accordance with my invention as illustrated in Fig. 2, it is distributed in a multiplicity of small successive strains, no one of which is sufficiently violent to break the slab 19. The line of strain 21 is not a square surface as in Fig. 1 but is a line extending across the width of the slab but with only a slight width. Therefore, a molecular dislocation of moderate amount in any one moment of time is all that is required. Putting the matter another way, the point 21, or rather the line represented by the point 21, travels across the slab from the edge 22 towards the edge 23 and its rate of travel can be reduced to so slow a rate that the shock or strain exerted on the slab 19, along the line 21 is absorbed at any one moment before the succeeding strain is applied. Therefore the slab 19 is not flexed along a given line to the breaking point.

The foregoing feature is further represented by Fig. 3 which shows the entire width of the mold. The lines 24, 25, 26, etc. represent the successive portions of the mold as the working point 21, or rather the working line indicated by the point 21 (Fig. 2) travels from the edge 22 towards the edge 23. Each of these parallel lines in Fig. 3 represents the width of a molecule or set of molecules. Only one of these lines is working at a given moment of time. Therefore the strain that is put upon the artificial stone in any one moment of time is merely the strain necessary to separate as many molecules as are contained in a linear row extending across the width of the slab.

Assuming, in a very rough way, that the number of molecules in the surface of the mold 18, squared, be 10,000, then by distributing the molecules in 100 rows, each of which contain 100 molecules, only 100 molecules must be displaced at one time. In Fig. 1 the 10,000 molecules must be lifted at a given moment of time, concentrating in that moment a strain of 10,000 units, whereas in Fig. 2, only 100 molecules are lifted at any one moment of time, which puts upon the stone slab a strain 100 times less than that in Fig. 1. Therefore, theoretically, a stone slab can be cast and taken off by the process embodying my invention as illustrated in Fig. 2, 100 times thinner than in Fig. 1, making it possible to form a film of stoneware instead of a slab, with all of the new uses that are possible, now that stone in the thickness of cardboard can be obtained.

While the film of stoneware is preferably thicker than the mold on which it is formed it is sufficiently thin to form a flexible film. It will be understood that a lace work fiber such, for example, as open mesh paper reinforced with fiber or other reinforcing material will be incorporated in the slab in order that a film of artificial stone may be handled without breaking as it is removed from the mold. The reinforcing member may be incorporated in the plastic, either while the film is in its plastic state or later. I have found that wood pulp, rolled and hardened and then teased into a ragged net can be used for the purpose of reinforcing the artificial stone. It will, of course be understood, however, that any suitable reinforcing material may be utilized.

While I have described my invention in its preferred embodiment, it is to be understood that the words which I have used are words of description rather than of limitation and that the drawing is merely illustrative. Hence, changes within the purview of the appended claims may be made without departing from the true scope and spirit of my invention.

What I claim is:

1. The method of making a lustrous artificial stone veneer which comprises applying to a thin flexible mold having a lustrous surface a self-hardening plastic cement capable, when hardened, of assuming the lustrous surface of said mold and of a thickness to form a flexible film, permitting the material to harden completely in situ thereby producing thereon the lustrous surface of said mold, and then removing the said mold from the material by progressively peeling the same therefrom.

2. The method of making a lustrous flexible stone veneer which comprises applying to a thin flexible mold having a lustrous surface a self-hardening plastic oxychloride cement capable, when hardened, of assuming the lustrous surface of said mold and of a thickness to form a flexible film, permitting the material to harden completely in situ thereby producing thereon the lustrous surface of said mold, and then removing said mold from said material by progressively peeling the same therefrom.

3. The method of making a lustrous artificial veneer which comprises applying to a thin flexible mold having a lustrous surface a cement selected from the group of oxychloride or oxysulphate cement capable, when hardened, of assuming the lustrous surface of said mold and of a thickness to form a thin flexible film, permitting the material to harden completely in situ, thereby producing thereon the lustrous surface of said mold, and then removing the said mold from said material by progressively peeling the same therefrom.

CHARLES B. WHITE.